Nov. 14, 1961     P. L. JOHNSON ET AL     3,008,485
INTERNAL SPRING TYPE SAFETY RELIEF VALVE
Filed Nov. 24, 1958
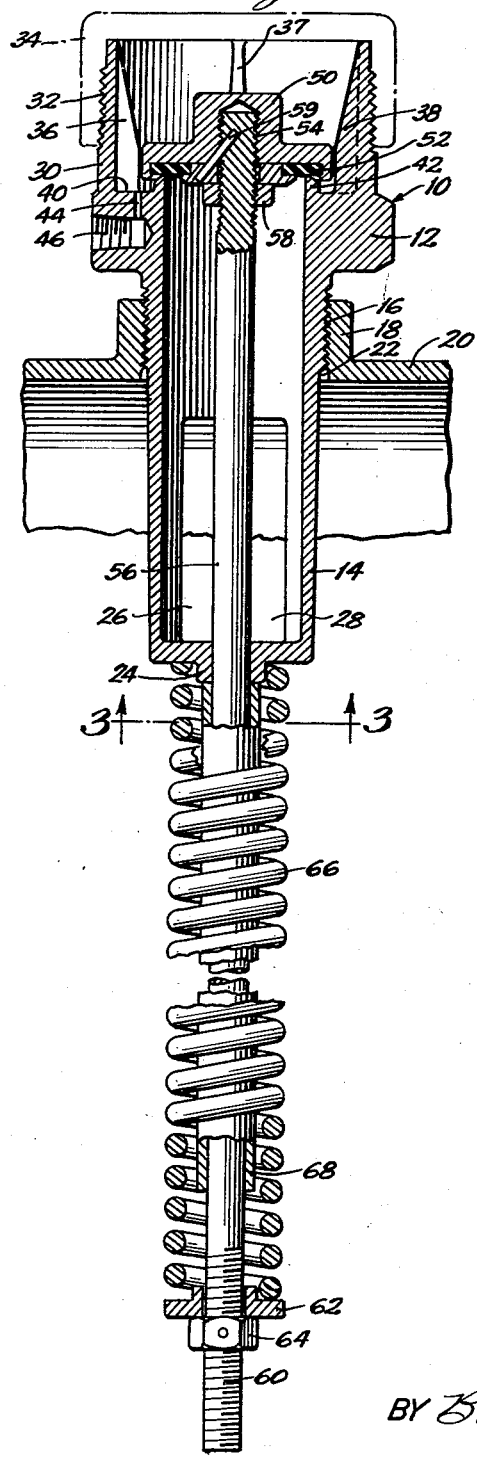
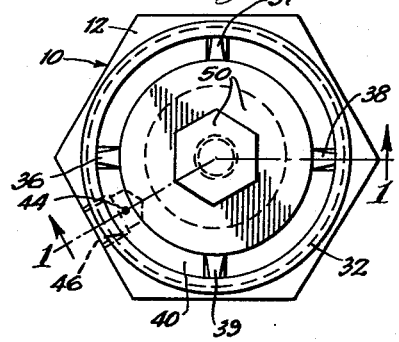
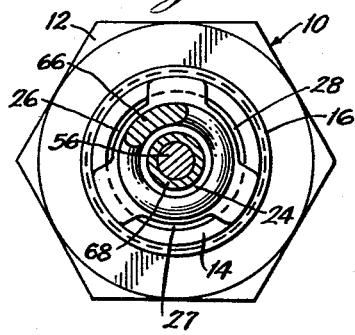
INVENTORS
Philip L. Johnson,
Paul B. Wayman
BY Bair, Freeman & Molinare
ATTORNEYS.

3,008,485
Patented Nov. 14, 1961

1

3,008,485
INTERNAL SPRING TYPE SAFETY
RELIEF VALVE
Philip L. Johnson and Paul B. Wayman, Marshalltown,
Iowa, assignors to Fisher Governor Company, a corporation of Iowa
Filed Nov. 24, 1958, Ser. No. 775,790
2 Claims. (Cl. 137—541)

This invention relates to improvements in internal spring type safety relief valves, and more particularly to such valves for use with liquefied petroleum gas storage containers.

In the storage of liquefied petroleum gas, and similar pressurized gas or liquefied gas storage systems, it is an essential requirement to provide efficient, safe and reliable pressure safety relief devices. Safety relief valve structures for applications of this type have been known in the past, but have presented substantial problems in insuring full guiding support of the relief valve poppet over an extended use-lifetime and under conditions of severe mechanical abuse. The valve poppet element of conventional safety relief valves is normally disposed entirely externally of the storage container with which it is employed, and it is necessarily subject to the risk of deforming impacts which present the hazards of possible valve leakage and unwanted vapor escape or locked parts engagement and inoperability for the intended pressure relief purpose. Still further, prior known structures have utilized costly and complex guide means for insuring efficiency and stability of valving action.

It is a primary object of this invention, therefore, to provide an internal spring type safety relief valve having a one-piece body unit providing integral inner and outer guide means for glidingly supporting the valve stem and centering the poppet head, respectively, of the valve structure during reciprocatory valving action.

It is another object of this invention to provide a relief valve of the type described, wherein a unitary external structure of high protective strength insures maintenance of safe valving action while withstanding the risk of severe accidental external impacts.

It is a further object of this invention to provide a relief valve of the type described, employing a one-piece body maintaining guiding support of the valve member at longitudinally widely spaced points, and integrally providing outlet flow openings therethrough, thereby achieving a simple and low cost structure of high performance reliability.

Further objects and advantages of this invention will become apparent as the following description proceeds, and the features of novelty which characterize this invention will be pointed out with particularity in the claims annexed to and forming part of this specification.

A preferred embodiment of the invention is shown in the accompanying drawing, in which:

FIGURE 1 is a vertical cross-sectional view of a safety relief valve constructed in accordance with the present invention and mounted in operative relation with a gas storage container;

FIGURE 2 is a top plan view of the valve structure of FIGURE 1; and

FIGURE 3 is a horizontal cross-sectional view taken substantially as indicated along line 3—3 of FIGURE 1.

Referring now more particularly to the drawing, we have designated generally at 10 an internal spring type safety relief valve embodying the principles and features of this invention. The device 10 comprises a one-piece body 12 defining a generally cylindrical, hollow tube 14 of substantially longitudinally elongated form. The tube 14 is externally threaded at 16 adjacent its outermost end for cooperation with an internally threaded boss 18 of

2 a pressurized gas storage container 20. The boss 18 defines an inlet opening 22 to the storage container 20, and through which the tube 14 extends within the interior of the container 20.

The elongated hollow tube 14 terminates at its inward end in an end wall which serves to define an inner guide collar 24. The tube 14, immediately outwardly of the guide collar 24, is formed with a plurality of outlet flow openings, three being indicated at 26, 27 and 28. In this way, flow communication is provided between the interior of the container 20 and the interior of the tube 14.

The body 12 provides an upstanding side wall at its outward end defining an outer guide collar 30. The outer guide collar 30 is externally threaded at 32 to receive a protective cap or the like 34, which is normally removed or readily removable and, therefore, shown in the drawing in phantom outline. The outer guide collar 30 is internally formed with a plurality of longitudinal ribs, four being shown at 36, 37, 38 and 39. The ribs 36 to 39 are relatively narrow and equidistantly spaced with respect to the periphery of the outer guide collar 30, and are each downwardly enlarged in a radial direction so as to provide a generally outwardly tapered form of diverging planar guide surfaces.

The outer guide collar 30 is disposed peripherally outwardly of, and concentric with, the top portion 14 of the body 12, so as to define an annular trough 40 therebetween. The outermost end of the tube 14 provides an annular valve seat lip 42. The lip 42 is radially inwardly spaced from, and concentric with, the inward enlarged ends of the guide ribs 36 to 39. A drain hole 44 extends from the trough 40 to a threaded drain discharge port 46.

A valve poppet 50 is disposed within the outer guide collar 30 and outwardly of the valve seat lip 42. The poppet 50 provides an annular valve disc 52 at its inward face formed of a suitable resilient material, such as rubber or the like, for gas-tight sealing engagement against the lip 42. The concentric spaced relation between the lip 42 and the lower enlarged ends of the ribs 36 to 39 permits a substantial peripheral overhang of the poppet valve disc 52 when in seated engagement therewith.

The poppet 50 is supported upon the outer threaded end 54 of a longitudinally elongated valve stem 56. A lock nut 58 and a lock pin 59 insure fixed interconnection between the poppet 50 and the stem 56. The innermost end of the valve stem 56 is threaded at 60, and slidably carries an abutment ring 62 which is adjustably positioned at an inward limit by a lock nut 64. An elongated helical spring is disposed in compression between the inner guide collar 24 and the abutment ring 62, and surrounding the valve stem 56. A cylindrical limit sleeve 68 is slidably carried externally of the valve stem 56 and within the spring 66. The length of the sleeve 68 is predetermined so as to provide cooperating abutment between its opposite ends and the inner guide collar 24 and the abutment ring 62. In this way, the maximum open position of the poppet 50 and the corresponding compression of the spring 66 is limited.

In practical operation, the strength of the compression spring 66 is sufficient so as to maintain the poppet 50 and its sealing disc 52 in closed-flow engagement with the valve seat lip 42. This valve-closed position will be maintained under all normal operating pressures within the container 20. In the event of an excessive pressure build-up within the container 20, requiring instantaneous pressure relief and immediate valve closure return, pressure will be transmitted through the outlet openings 28 to the interior of the tube 14 and against the valve poppet 50. If the pressure is sufficiently high relative to the predetermined safety-limit strength of the compression spring 66, the valve poppet 50 will move outwardly to enable relief pressure flow. The maximum outward position of the poppet 50 will be determined by engagement of the abutment ring 62 with the inward end of the limit sleeve 68.

It is an important feature of this invention that the valve stem 56 is slidably supported by the integral inner guide collar 24 of the body 12. The longitudinal extent of engagement between the inner guide collar 24 and the stem 56 is small relative to the diameter of the stem 56. The tapered guide ribs 36 to 39 effect cooperating guiding engagement with the poppet 50 so as to insure axial centering thereof during valving action. The axial distance between the guide collar 24 and the ribs 36 to 39 is many times the axial extent of the guide collar 24. In effect, the valve structure is both slidably and guidingly supported at longitudinally widely spaced points, inner guiding cooperation being provided by the inner guide collar 24 in engagement with the stem 56, and outer guiding cooperation being provided by the internal ribs 36 to 39 of the outer guide collar 30 in engagement with the poppet 50. These integral and coordinated inner and outer guide means serve to insure smoothly supported valving action.

The outwardly tapered form of the guide ribs 36 to 39 allows a friction-free operation of the poppet 50 while providing a self-centering action for valve-closing movement. The guide ribs 36 and 39 serve to perform a further important function in that they effect a substantial strengthening reinforcement of the collar 30 against risk of deformation by accidental external impacts. The outwardly tapering form of the ribs 36 to 39 further insures that even if a substantial accidental deformation of the outermost end of the guide collar 30 should occur, there will be no risk of binding engagement between the deformed collar and rib portions with the poppet 50. In this way, a normal valve seal will be maintained, and operability when required will be assured, under extreme service conditions and mechanical abuse.

It is a still further important feature of this invention that the valve body 12 is of unitary or one-piece form, wherein both the valve poppet guide means and the valve stem guide means are integrally provided. Such a unitary structure enables the provision of a relatively great axial distance between the inner guide means and the outer guide means for very accurate centering of the poppet 50 and its disc 52 against the lip 42. At the same time, the outlet openings 26 to 28, the inner guide collar means 24, the outer guide collar 30 and its internal ribs 36 to 39, and the valve seat lip 42 may all be formed from a single forged body blank by simple machining operations, thereby eliminating complex and costly milling or piercing operations. In addition, very accurate concentricity of the inner guide means and the outer guide means with respect to the poppet and its stem, respectively, is achieved. The parts which must be handled during production may thus be reduced, and the concentricity problems which are inherent in axially elongated valve structures and which are increased by multiple and complex parts can be effectively eliminated, thereby achieving economical manufacture and assembly.

While there has been shown and described a particular embodiment of this invention, it will be obvious to those skilled in the art that various changes and modifications may be made therein without departing from the invention, and, therefore, it is intended in the appended claims to cover all such changes and modifications as fall within the true spirit and scope of the invention.

What we claim as new and desire to secure by Letters Patent of the United States is:

1. A safety relief valve comprising a unitary, one-piece body of generally hollow tubular form adapted to be mounted in extended relation through the wall of an associated container, said body integrally terminating at its inward end in a transverse wall apertured to define inner guide means and integrally terminating at its outward end in an annular collar having integrally formed thereon a plurality of rigid transversely inwardly projecting ribs collectively defining outer guide means, said ribs being circumferentially spaced and each linearly inwardly enlarged in a radial direction so as to provide a generally outwardly tapered form of diverging planar guide surfaces, said body having a flow opening at its said inward end, said body providing an integral annular valve seat at its said outward end inwardly spaced from and independently of said outer guide means and coaxial with said collar, an elongated valve stem extending longitudinally through said body and axially projecting substantially beyond said inward end wall, said valve stem being slidably supported by said inner guide means for valving reciprocation, a valve poppet carried by said valve stem at its outward end and providing a planar circular surface for inward seating engagement with said valve seat, said valve poppet being guidingly supported and centered by said outer guide ribs for valving reciprocation, and elongated spring means seating between the free end of said valve stem and said body for normally biasing said valve poppet closed.

2. A safety relief valve comprising a unitary, one-piece body of generally hollow tubular form adapted to be mounted in extended relation through the wall of an associated container, said body integrally terminating at its inward end in a transverse wall apertured to define inner guide means and integrally terminating at its outward end in an axially elongated annular collar having integrally formed thereon a plurality of transversely inwardly projecting ribs collectively defining outer guide means, said ribs being circumferentially spaced and each linearly inwardly enlarged in a radial direction so as to provide a generally outwardly tapered form of diverging planar guide surfaces, said body having a flow opening at its said inward end, said body providing an integral annular valve seat at its said outward end inwardly spaced from and independently of said outer guide means and coaxial with said collar, an elongated valve stem extending longitudinally through said body and axially projecting substantially beyond said inward end wall, said valve stem being slidably supported by said inner guide means for valving reciprocation, a valve poppet carried by said valve stem at its outward end and having a planar circular surface for inward seating engagement with said valve seat, said outward end annular collar fully peripherally enclosing and extending substantially axially beyond said valve poppet when seated to provide a protective enclosure therefor, said valve poppet being guidingly supported and centered by said outer guide ribs for valving reciprocation, and elongated spring means seating between the free end of said valve stem and said body for normally biasing said valve poppet closed.

References Cited in the file of this patent

UNITED STATES PATENTS

| | | |
|---|---|---|
| 1,404,639 | Phelps | Jan. 24, 1922 |
| 2,790,460 | Radd | Apr. 30, 1957 |
| 2,821,991 | Marx | Feb. 4, 1958 |
| 2,834,374 | Klinkenberg | May 13, 1958 |
| 2,854,021 | Baldwin | Sept. 30, 1958 |

OTHER REFERENCES

RegO Safety Relief Valves, by the Bastian-Blessing Co. of Chicago; Catalog L–500, section LH of July 25, 1941, page LH–9 (class 137, subclass 540).